US005333449A

United States Patent [19]

Takahashi et al.

[11] Patent Number: 5,333,449

[45] Date of Patent: Aug. 2, 1994

[54] PRESSURE COMPENSATING VALVE ASSEMBLY

[75] Inventors: Kinya Takahashi, Tsuchiura; Yusaku Nozawa, Ibaraki; Kazuyuki Ino, Shimodate, all of Japan

[73] Assignee: Hitachi Construction Machinery Co., Ltd., Tokyo, Japan

[21] Appl. No.: 39,339

[22] PCT Filed: Sep. 2, 1991

[86] PCT No.: PCT/JP92/01120

§ 371 Date: Apr. 27, 1993

§ 102(e) Date: Apr. 27, 1993

[87] PCT Pub. No.: WO93/05301

PCT Pub. Date: Mar. 18, 1993

[30] Foreign Application Priority Data

Sep. 2, 1991 [JP] Japan ........ 3-246441

[51] Int. Cl.[5] ........ F16D 31/02; F15B 11/08

[52] U.S. Cl. ........ 60/427; 60/452; 60/484; 91/446; 91/448; 91/461

[58] Field of Search ........ 60/422, 450, 451, 484, 60/494, 427, 489, 452; 91/446, 448, 461

[56] References Cited

U.S. PATENT DOCUMENTS 3,942,413 3/1976 Schwary et al. ........ 60/426 X
4,061,201 12/1977 Dunn ........ 60/422 X
4,087,968 5/1978 Bianchetto ........ 60/452 X
4,517,800 5/1985 Karakama et al. ........ 60/452 X
4,617,854 10/1986 Kropp .
4,845,948 7/1989 Tha et al. ........ 60/427
5,212,950 5/1993 Shirai et al. ........ 91/461

FOREIGN PATENT DOCUMENTS 59-9302 1/1984 Japan .
60-11706 1/1985 Japan .

OTHER PUBLICATIONS

"Practical Oil Hydraulic Pocketbook", (1986), Hydraulic Industries Association of Japan, pp. 190–191.
"Oil Hydraulic Power and Its Industrial Applications", McGraw-Hill Book Company, Inc., 1960, pp.246, 249–250.

*Primary Examiner*—Edward K. Look
*Assistant Examiner*—John Ryznic
*Attorney, Agent, or Firm*—Fay, Sharpe, Beall, Fagan, Minnich & McKee

[57] ABSTRACT

A hydraulic drive system for construction machines with an improved pressure compensating valve assembly comprising a first directional control valve (3, 5, 7) of closed center type connected in series with a second directional control valve (12) of open center type. The valve assembly comprises an inlet chamber (31) connected to the hydraulic pump (1) and an outlet chamber (33) connected to the second directional control valve (12) of open center type; a flow control valve portion (14A) including a spool (37) having an opening (37*a*) disposed between the inlet chamber and the outlet chamber, an extent of the opening being changed when the spool is displaced, and a manually operable adjuster (39*a*) adapted to abut against the spool for setting the extent of the opening; a pressure compensating valve portion (14B) for holding a differential pressure across the extent of the opening (37*a*) constant; a spring (43) disposed in the flow control valve portion (14A) for urging the spool (37) in a direction to close the opening (37*a*); and an operating pressure introducing plug (44) to which an operating pressure is introduced for displacing the spool (37) against the spring (43) in a direction to open the opening until the spool (37) comes into abutment against the adjuster (39).

4 Claims, 4 Drawing Sheets

PRESSURE COMPENSATING VALVE ASSEMBLY

DESCRIPTION

1. Field of the Invention

The present invention relates to a valve apparatus for use in a hydraulic drive system of construction machines such as hydraulic excavators, and more particularly to a valve apparatus used when an optional hydraulic actuator is attached to a hydraulic drive system of load sensing type.

2. Background Art

Recently, in hydraulic drive systems for construction machines such as hydraulic excavators, for example, from the standpoint of economy, many machines have adopted load sensing control by which a delivery pressure of a hydraulic pump is controlled to be held higher by a fixed value than the highest one of the load pressures of plural hydraulic actuators. On the other side, in consideration of versatility of work to be carried out, such an arrangement has been adopted that an optional hydraulic actuator such as a crasher is detachably attached to the end of a front.

As disclosed in JP, A, 60-11706, for example, a hydraulic drive system of load sensing type uses, as a directional control valve for controlling a flow of hydraulic fluid supplied from a hydraulic pump to a hydraulic actuator, a directional control valve of closed center type that is blocked at the center in its neutral position and has a load pressure detecting function. On the other hand, a hydraulic drive system provided with a directional control valve of open center type that is kept fluid-communicated at the center in its neutral position, has been known for many years and has become widespread. At the present time, it is not said that the directional control valve of closed center type for use in the hydraulic drive system of load sensing type is so common as the directional control valve of open center type.

Meanwhile, the hydraulic drive system of load sensing type includes a pressure compensating valve which holds constant a differential pressure across a flow control portion of the directional control valve for the purpose of maintaining a plurality of actuators independently of one another when those actuators are driven at the same time. A single valve apparatus having both a flow control function and a pressure compensating function has so far been described in "Practical Oil Hydraulic Pocketbook (1986)", pp. 190–191, Hydraulic Industries Association of Japan (Incorporated Body) and "Oil Hydraulic Power And Its Industrial Applications", pp. 246, 249 and 250, Walter Ernst, 1960, McGraw-Hill Book Company, Inc., for example. That valve apparatus has an inlet chamber and an outlet chamber; a flow control valve portion comprising a passage communicating between the inlet chamber and the outlet chamber, a spool disposed between the communicating passage and the outlet chamber and having an opening, the extent which is changed when displaced, and a manually operable adjuster held abutted against the spool for setting an extent of the opening; and a pressure compensating valve disposed between the inlet chamber and the communicating passage for holding constant a pressure difference between a pressure in the communicating passage and the outlet chamber, i.e., a differential pressure across the opening. The flow control valve portion includes a spring for urging the spool in a direction to open the opening until the spool abuts against the adjuster, and the opening extent is set by manually operating the adjuster from the exterior.

DISCLOSURE OF THE INVENTION

When an optional hydraulic actuator is mounted to a hydraulic drive system, a directional control valve is also provided on the optional hydraulic actuator. In the case of providing the directional control valve on the optional hydraulic actuator, there is a demand on the side of designers and manufacturers to provide a directional control valve of open center type that is more general and more easily available as mentioned before. The same demand is seen in the case of mounting the optional hydraulic actuator to a hydraulic drive system of load sensing type. However, when the directional control valve of open center type is attached to the hydraulic drive system of load sensing type, the load sensing control could not be performed if the valve is used as it is. The reason is as follows.

In the directional control valve of open center type, the center is kept fluid-communicated in the neutral position, as mentioned before. This means that when the directional control valve of open center type is in the neutral position, the hydraulic pump is communicated with a reservoir through the directional control valve. Accordingly, if the directional control valve is in the neutral position during periods when the optional hydraulic actuator is not in use, the hydraulic fluid from the hydraulic pump would flow out to the reservoir through the directional control valve. As a result, when an associated directional control valve is operated in an attempt of driving some other ordinary actuator, the pump delivery pressure could not be raised and the load sensing control would fail to effect.

Meanwhile, there are several types of optional hydraulic actuators which have different capacities dependent upon the types. Therefore, specifications of the spool and its opening are usually specified such that the directional control valve can supply the hydraulic fluid at such a flow rate as required when the actuator of maximum capacity is attached. For this reason, when one optional hydraulic actuator of maximum capacity is replaced by another of smaller capacity, it is required from the standpoint of safety that the flow rate of the hydraulic fluid supplied to the directional control valve is limited to a smaller flow rate in match with the capacity of the optional hydraulic actuator to be used, thereby restricting the maximum flow rate available by that actuator.

As a measure for satisfying the above requirement, it is thought to arrange the above-explained known valve apparatus, which has both a flow control function and a pressure compensating function, upstream of the directional control valve of open center type. However, this counter-measure gives rise to a problem below.

The conventional valve apparatus is arranged, as stated before, such that the spool of the flow control valve portion is urged by the spring in the direction to open the opening until the spool abuts against the adjuster. This implies that the valve apparatus is normally open. Accordingly, in order to prevent the hydraulic fluid supplied from the hydraulic pump from flowing out to the reservoir through the directional control valve when the directional control valve is in the neutral position during periods when the optional hydraulic actuator is not in use, the valve apparatus must be closed. In other words, after using the optional hydraulic actuator, it is required for the operator to manually regulate the adjuster to return the extent of the opening to zero.

In such an arrangement of manually closing the opening of the spool, when the optional hydraulic actuator is used again, the operator is required to regulate the adjuster again for making the opening of the spool open. At this time, because the flow rate of the hydraulic fluid supplied from the valve apparatus to the directional control valve is determined to be a fixed flow rate dependent upon the capacity of the optional hydraulic actuator, the opening of the spool must be set to a predetermined extent with high accuracy.

Thus, the conventional valve apparatus requires the operator to operate the adjuster for adjusting the opening extent each time before and after the optional hydraulic actuator is used, and this adjustment is laborious. In addition, the adjustment before starting use of the optional hydraulic actuator is very troublesome because if the adjustment is not performed so highly accurately, it often happens that the opening extent cannot be set to a predetermined value and the flow rate of the hydraulic fluid passing through the opening is changed.

Additionally, since the opening extent is adjusted by manually operating the adjuster, it is necessary for the operator to directly operate the adjuster, thus making the structure not suitable for remote control.

An object of the present invention is to provide a valve apparatus which can easily adjust an extent of an opening, can precisely set the opening extent when it is to be set again, and is superior in operability.

Another object of the present invention is to provide a valve apparatus which can remotely adjust the extent of the opening.

To achieve the above objects, in accordance with the present invention, there is provided a valve apparatus used in a hydraulic drive system for construction machines comprising a hydraulic pump of variable displacement type, at least one first hydraulic actuator driven by a hydraulic fluid delivered from said hydraulic pump, a first directional control valve of closed center type for controlling a flow of the hydraulic fluid supplied from said hydraulic pump to said first hydraulic actuator, transmission means for introducing a load pressure of said first hydraulic actuator therethrough, a regulator for controlling a displacement volume of said hydraulic pump based on the load pressure introduced through said transmission means to perform load sensing control, an optional second hydraulic actuator driven by the hydraulic fluid delivered from said hydraulic pump, and a second directional control valve of open center type for controlling a flow of the hydraulic fluid supplied from said hydraulic pump to said second hydraulic actuator, wherein said valve apparatus comprises: (a) an inlet chamber connected to said hydraulic pump and an outlet chamber connected to said second directional control valve of open center type; (b) flow control valve means including a spool having an opening disposed between said inlet chamber and said outlet chamber, an extent of the opening being changed when said spool is displaced, and manually operable adjuster means adapted to abut against said spool for setting the extent of said opening; (c) pressure compensating valve means for holding a differential pressure across said extent of the opening constant; (d) spring means disposed in said flow control valve portion for urging said spool in a direction to close said opening; and (e) operating pressure introducing means to which an operating pressure is introduced for displacing said spool against said spring in a direction to open said opening until said spool comes into abutment against said adjuster means.

In the present invention thus arranged, when the optional second hydraulic actuator is not used, the operating pressure is not introduced to the operating pressure introducing means so that the spool is displaced by the urging force of the spring means to close the opening. This prevents the hydraulic fluid from flowing out of the outlet chamber. Therefore, the hydraulic fluid will not be supplied to the second directional control, and the pump delivery pressure can be raised. Thus, by operating the first directional control valve associated with the first hydraulic actuator, the regulator can be driven to perform the load sensing control in an appropriate manner.

On the other hand, when the optional second hydraulic actuator is used, the operating pressure is introduced to the operating pressure introducing means and the spool is displaced against the urging force of the spring means until it abuts against the adjuster means. The opening of the spool is thereby opened to such an extent as preset by the adjuster means. Therefore, with no need of regulating the adjuster means by the operator, the flow rate of the hydraulic fluid passing through the flow control valve means is precisely set again and the hydraulic fluid is supplied to the second directional control valve at a flow rate in accord with the capacity of the optional hydraulic actuator. Further, when the introduction of the operating pressure is stopped, the spool is moved by the urging force of the spring in the closing direction to make the opening extent zero. The introduction of the operating pressure can be switched over under remote control.

Preferably, the above valve apparatus further comprises a load port to which a pressure in the outlet chamber is introduced, the load port being connected to the transmission means so that the pressure in the outlet chamber is introduced to the transmission means as a load pressure. With this arrangement, while using the second directional control valve of open center type, the regulator can be driven with the load pressure of the optional second hydraulic actuator to effect the load sensing control, and the piping structure for introducing the load pressure can be simplified.

Also preferably, in the above valve apparatus, the hydraulic drive system comprises a pilot valve for producing a pilot pressure to operate the second directional control valve, the pilot pressure being introduced to the operating pressure introducing means as the operating pressure. By so doing, the operation of closing the opening of the spool and the operation of enlarging the opening to the set extent can automatically be performed in interlock with the operation of the second directional control valve. Alternatively, the hydraulic drive system may comprise a specific pilot valve for producing a pilot pressure to operate the flow control valve means, the pilot pressure being introduced to the operating pressure introducing means as the operating pressure.

BEST MODE FOR CARRYING OUT THE INVENTION

Figure 1:
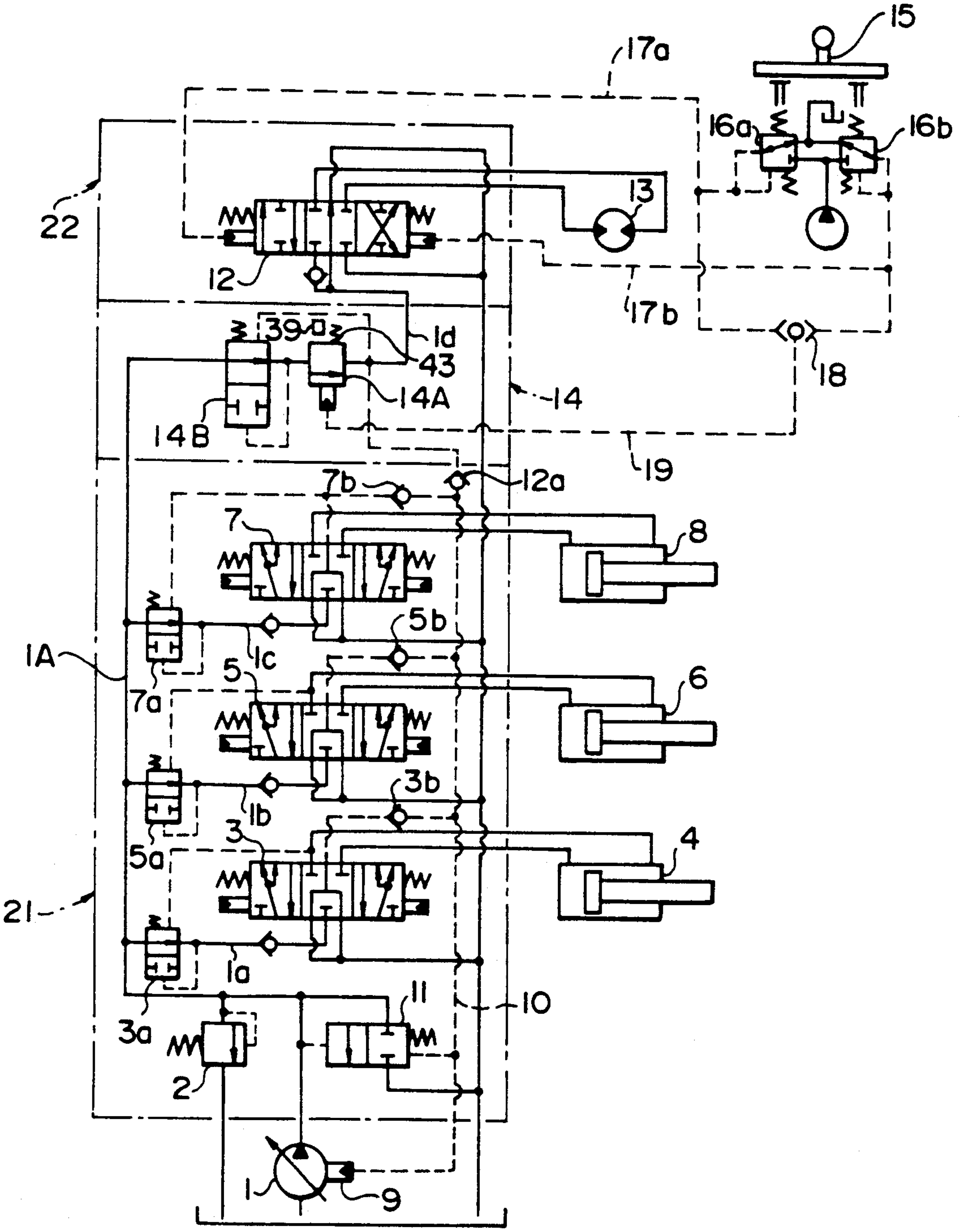
FIG. 1 is a circuit diagram showing a hydraulic drive system for construction machines equipped with a valve apparatus according to one embodiment of the present invention.

A first embodiment of the present invention will be described with reference to FIGS. 1 to 3.

To begin with, the description will be given of a hydraulic drive system of load sensing type in which a valve apparatus of this embodiment is equipped. In FIG. 1, the hydraulic drive system of load sensing type comprises a hydraulic pump 1 of variable displacement type for supplying a hydraulic fluid to a main circuit 1A, a relief valve 2 for specifying a maximum pressure of the hydraulic fluid supplied to the main circuit 1A, a first directional control valve 3 of closed center type which is connected to a most upstream supply line 1*a* of the main circuit 1A and controls the outflow direction and flow rate of the hydraulic fluid from the hydraulic pump 1, a first hydraulic actuator 4 of which driving is controlled with operation of the first directional control valve 3, a second directional control valve 5 of closed center type which is connected to a second supply line 1*b* counted from the most upstream side of the main circuit 1A and controls the outflow direction and flow rate of the hydraulic fluid from the hydraulic pump 1, a second hydraulic actuator 6 of which driving is controlled with operation of the second directional control valve 5, a third directional control valve 7 of closed center type which is connected to a third supply line 1*c* counted from the most upstream side of the main circuit 1A and controls the outflow direction and flow rate of the hydraulic fluid from the hydraulic pump 1, and a third hydraulic actuator 8 of which driving is controlled with operation of the third directional control valve 7. These directional control valves 3, 5, 7 are connected in parallel to the hydraulic pump 1 through the supply lines 1*a*, 1*b*, 1*c*. Further, pressure compensating valves 3*a*, 5*a*, 7*a* are disposed in the supply lines 1*a*, 1*b*, 1*c*, respectively, for holding constant differential pressures across the first, second and third directional control valves 3, 5, 7.

The hydraulic drive system also comprises a fourth directional control valve 12 of open center type which is connected to a most downstream supply line 1*d* of the main circuit 1A and controls the outflow direction and flow rate of the hydraulic fluid from the hydraulic pump 1, and an optional hydraulic actuator 13 of which driving is controlled with operation of the fourth directional control valve 12 to drive a working appliance such as a crasher, for example. A valve apparatus 14 of this embodiment is installed upstream of the directional control valve 12, i.e., in the supply line 1*d*.

The hydraulic drive system further comprises check valves 3*b*, 5*b*, 7*b*, 12*a* for detecting the maximum load pressure among the hydraulic actuators 4, 6, 8 and the optional hydraulic actuator 13, a transmission line 10 for introducing the detected maximum load pressure therethrough, a regulator 9 for load sensing control which introduces, as a control pressure, the maximum load pressure in the transmission line 10 and controls a displacement volume (capacity) of the hydraulic pump 1 so that a pressure in the main circuit 1A, i.e., a delivery pressure of the hydraulic pump 1, is held higher by a first fixed value than the maximum load pressure, and an unloading valve 11 which is operable in response to the pressure in the transmission line 10 and the pressure in the main circuit 1A and operated when the pressure in the main circuit 1A, i.e., the delivery pressure of the hydraulic pump 1, is higher than the maximum load pressure by a second fixed value greater than the first fixed value, thereby returning the hydraulic fluid in the main circuit 1A to the reservoir.

The directional control valves 3, 5, 7, 12 are each of the hydraulic pilot operating type. The directional control valve 12, by way of example, is associated with a pair of hydraulic pilot valves 16*a*, 16*b* operated by a control lever 15. The pilot valves 16*a*, 16*b* each produce a pilot pressure dependent upon an input amount from the control lever 15, the pilot pressure being delivered to a pilot operating sector of the directional control valve 12 through pilot lines 17*a*, 17*b*, respectively, for operating the directional control valve 12. Though not shown, the directional control valves 3, 5, 7 are each similarly associated with a pair of hydraulic pilot valves having a control lever.

Figure 2:
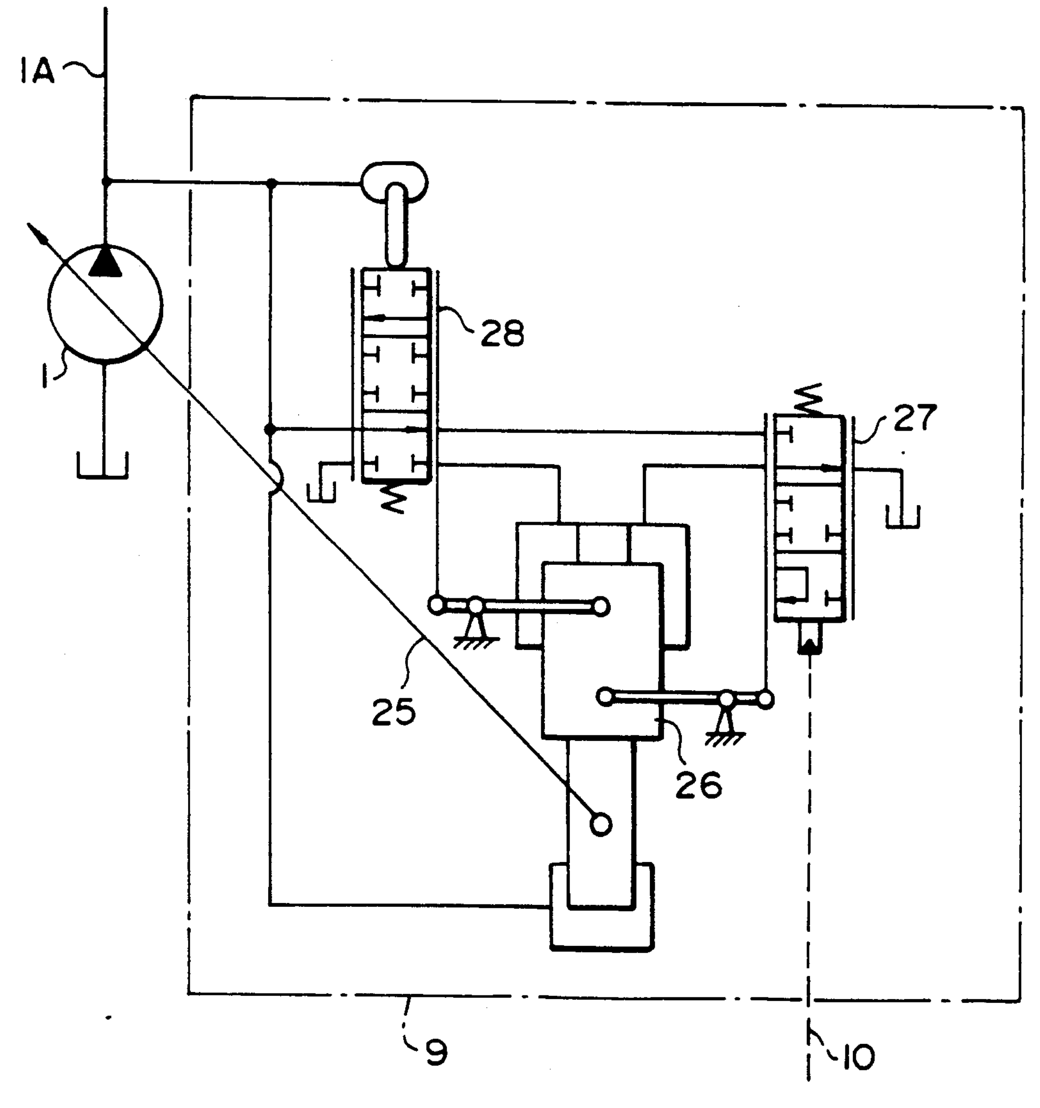
FIG. 2 is a circuit diagram showing details of a regulator shown in FIG. 1.
Figure 3:
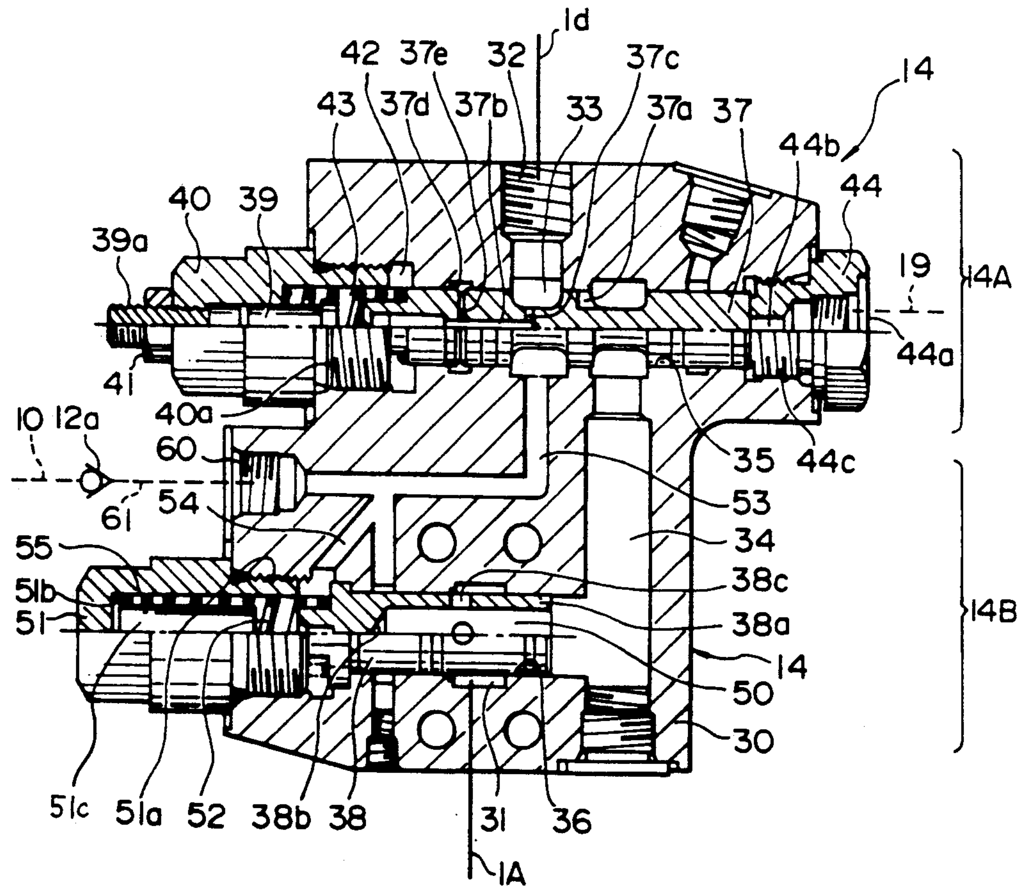
FIG. 3 is a sectional view showing the structure of the valve apparatus of one embodiment.
Figure 4:
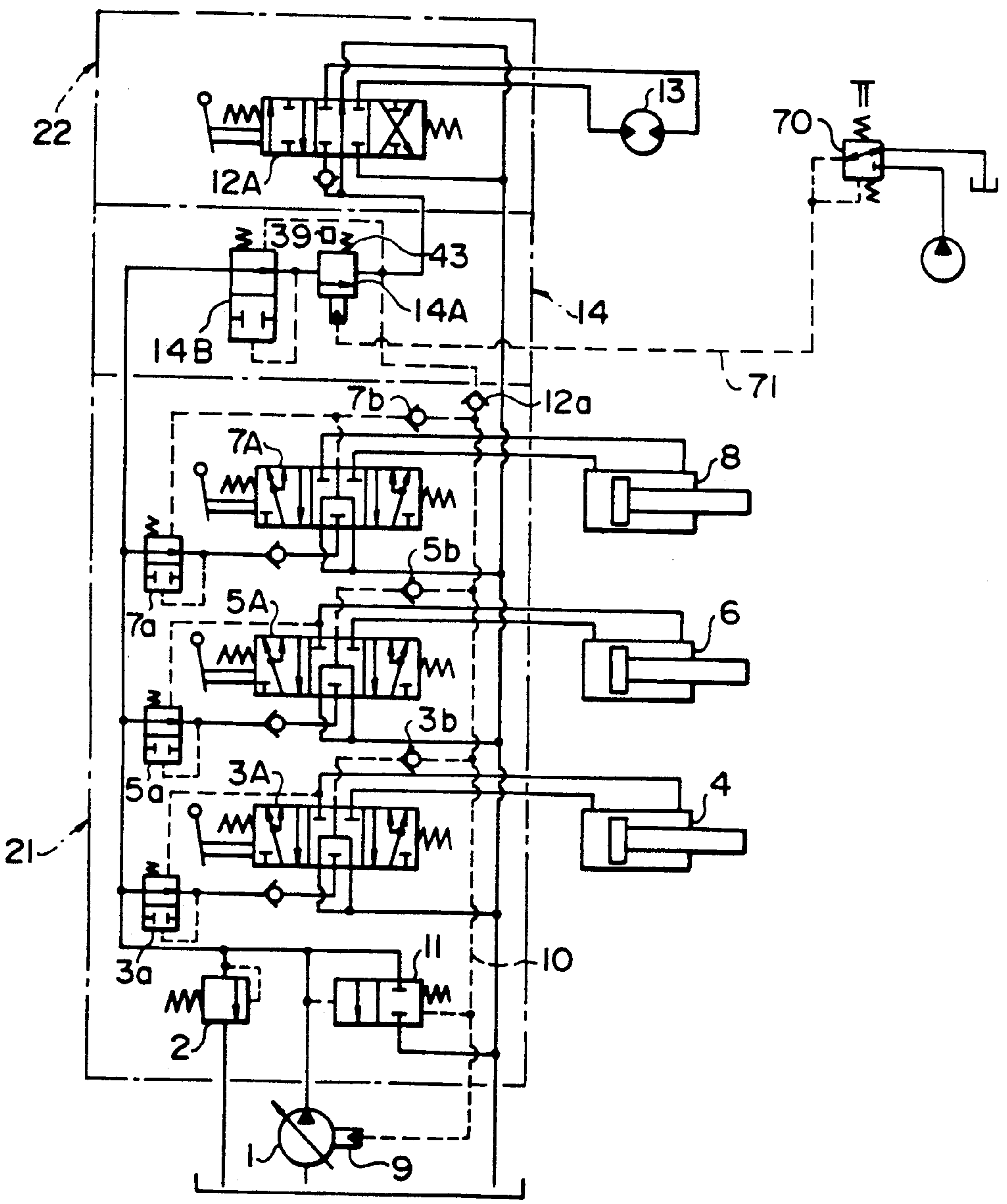
FIG. 4 is a circuit diagram, similar to FIG. 1, showing a modification of control means for the valve apparatus of the present invention.

The regulator 9 for load sensing control comprises, as shown in FIG. 2, a piston/cylinder unit 26 for driving a displacement volume varying mechanism 25 of the hydraulic pump 1, a first servo valve 27 operated in response to the maximum load pressure introduced through the transmission line 10 for adjusting a flow rate of the hydraulic fluid supplied to the piston/cylinder unit 26 to thereby control the displacement volume of the hydraulic pump 1, and a second servo valve 28 operated in response to the pump delivery pressure for adjusting the flow rate of the hydraulic fluid supplied to the piston/cylinder unit 26 to thereby control the displacement volume of the hydraulic pump 1 for the purpose of limiting input torque.

Roughly speaking, the valve apparatus 14 of this embodiment comprises a flow control valve portion 14A for setting a flow rate of the hydraulic fluid supplied to the fourth directional control valve 12, and a pressure compensating valve portion 14B for holding constant a differential pressure across the flow control valve portion 14A. Further, a check valve 18 for taking out the pilot pressure is disposed in the pilot lines 17*a*, 17*b* extending from the hydraulic pilot valves 16*a*, 16*b*, the taken-out pilot pressure being introduced to the flow control valve portion 14A of the valve apparatus 14 through a pilot line 19.

In general, the directional control valves 3, 5, 7 and the associated pressure compensating valves 3*a*, 5*a*, 7*a* are constructed as a single valve assembly 21, while the valve apparatus 14 is constructed separately from the valve assembly 21 and connected to the valve assembly 21 through pipings. Also, the directional control valve 12 is constructed as an additional valve apparatus 22 separate from the valve apparatus 14, and detachably connected to the valve apparatus 14 through pipings.

In the above hydraulic drive system, when the first to third directional control valves 3, 5, 7 are operated, as required, by operating the associated hydraulic pilot valves (not shown), the hydraulic fluid from the hydraulic pump 1 is supplied to the first to third hydraulic actuators 4, 6, 8, and the maximum one of the load pressures of the hydraulic actuators being simultaneously driven is introduced to the regulator 9 through the transmission line 10, whereupon the displacement volume of the hydraulic pump 1 is controlled under action of the first servo valve 27 so that the delivery pressure of the hydraulic pump 1 is held higher by a fixed value than the maximum load pressure. At this time, the flow control valve portion 14A of the valve apparatus 14A is closed (described later). Therefore, although the fourth directional control valve is of the open center type, the hydraulic fluid from the hydraulic pump 1 will not return to the reservoir through the optional directional control valve 12, and the pressure effective in driving the hydraulic actuators 4, 6, 8 is produced in the main line 1A under the load sensing control.

On the other hand, when the fourth directional control valve 12 is operated, as required, by operating the hydraulic pilot valve 16*a* or 16*b*, the flow control valve portion 14A of the valve apparatus 14 is opened (described later), the hydraulic fluid from the hydraulic pump 1 is supplied to the fourth directional control valve 12 at a flow rate controlled.dependent upon the set opening of the flow control valve portion 14A and then the hydraulic fluid is supplied to the optional hydraulic actuator 13 dependent upon the input amount to the fourth directional control valve 12. At this time, if the pressure of the hydraulic fluid delivered from the hydraulic pump 1, i.e., the pressure in the inlet side of the flow control valve portion 14A of the valve apparatus 14, increases, the pressure compensating valve portion 14B is operated toward the restricting side to lower the pressure in the inlet side of the flow control valve portion 14A. Conversely, if the pressure of the hydraulic fluid delivered from the hydraulic pump 1 decreases, the pressure compensating valve portion 14B is operated toward the more opening side to raise the pressure in the inlet side of the flow control valve portion 14A. Further, if the load pressure of the hydraulic actuator 13, i.e., the pressure in the outlet side of the flow control valve portion 14A, increases, the pressure compensating valve portion 14B is operated toward the more opening side to raise the pressure in the inlet side of the flow control valve portion 14A. Conversely, if the load pressure of the hydraulic actuator 13 decreases, the pressure compensating valve portion 14B is operated toward the restricting side to lower the pressure in the inlet side of the flow control valve portion 14A. Thus, the pressure compensating valve portion 14B is appropriately operated dependent upon fluctuations in the delivery pressure of the hydraulic pump 1 and fluctuations in the load pressure of the hydraulic actuator 13 to hold constant the differential pressure across the flow control valve portion 14A. The valve apparatus 14 thereby supplies the hydraulic fluid to the directional control valve 12 at a constant flow rate dependent upon the set opening of the flow control valve portion 14A. In other words, the valve apparatus 14 functions as a fixed pump for supplying the hydraulic fluid to the directional control valve 12 at the constant flow rate.

Meanwhile, there are several types of optional hydraulic actuators which have different capacities dependent upon the types. Therefore, specifications of the spool and its opening are specified such that the fourth directional control valve 12 can supply the hydraulic fluid at such a flow rate as required when the actuator of maximum capacity is attached. For this reason, when one optional hydraulic actuator of maximum capacity is replaced by another of smaller capacity, it is required from the standpoint of safety that the flow rate of the hydraulic fluid supplied to the directional control valve is limited to a smaller flow rate in accord with the capacity of the optional hydraulic actuator to be used. The valve apparatus 14 has such a function of restricting the flow rate. If the hydraulic actuator 13 is one which has the capacity smaller than the maximum capacity, the set opening of the flow control valve portion 14A is so determined as to supply the hydraulic fluid at a smaller flow rate corresponding to the capacity of the hydraulic actuator 13. As a result, even if the operator should overly operate the directional control valve 12 by mistake, the hydraulic fluid will not be supplied to the hydraulic actuator 13 at a flow rate greater than the set flow rate, thus ensuring safety in the operation.

Additionally, the outlet pressure of the flow control valve portion 14A fluctuating dependent upon the load of the hydraulic actuator 13 is equivalent to the load pressure of the hydraulic actuator 13. That load pressure is introduced, as the maximum load pressure, to the regulator 9 through the transmission line 10 and the displacement volume of the hydraulic pump 1 is controlled so that the delivery pressure of the hydraulic pump 1 is held higher by a fixed value than the maximum load pressure. Thus, even when the directional control valve 12 of open center type is operated, the load sensing control is performed similarly to the case of the directional control valves 3, 5, 7 of closed center type being operated.

By using the valve apparatus 14, as explained above, the directional control valve 12 of open center type that is more common more easily available can be connected to the hydraulic drive system of load sensing type, and productivity can be increased in mounting optional hydraulic actuators to hydraulic drive systems of load sensing type. Further, even with the directional control valve 12 being maximally operated, the hydraulic fluid will not be supplied to the hydraulic actuator 13 at a flow rate in excess of the set opening of the flow control valve portion and, as a result, safety in the operation is ensured.

The structure of the valve apparatus 14 of this embodiment will be described below by referring to FIG. 3. The valve apparatus 14 has a valve body 30 in which there are formed an inlet port (not shown) and an inlet chamber 31 both connected to the hydraulic pump 1 through the main circuit 1A, an outlet port 32 and an outlet chamber 33 both connected to the directional control valve 12 of the optional hydraulic actuator 13 through the supply line 1*d*, and a communicating passage 34 communicating between the inlet chamber 31 and the outlet chamber 33. A valve bore 35 is formed in the valve body 30 at a joining position between the outlet chamber 33 and the communicating passage 34, while a valve bore 36 is formed in the valve body 30 at a joining position between the inlet chamber 31 and the communicating passage 34. A first spool 37 is axially slidably fitted in the valve bore 35, and a second spool 38 is axially slidably fitted in the valve bore 36. The first spool 37 is formed with a plurality of circumferential notches 37*a* which define an opening to communicate between the communicating passage 34 and the outlet chamber 33, and an opening extent of the notches 37*a* (i.e., a degree of the opening of the first spool 37) is changed dependent upon the displacement of the first spool 37, i.e., the spool stroke. The second spool 38 is a spool of hollow and bottom-equipped type which comprises a tubular side wall 38*a* and a bottom wall 38*b*. A plurality of circumferential through holes 38*c* define an opening to communicate between the inlet chamber 31 and the communicating passage 34, and an opening extent of the through holes 38*c* (i.e., a degree of the opening of the second spool 38) is changed dependent upon the displacement of the second spool 37, i.e., the spool stroke.

Leftwardly of the first spool 37, as viewed on the drawing, there is provided an adjuster 39 which comes into abutment against the first spool 37 and determines a stop position of the first spool 37 in the direction to open the notches 37*a*. The adjuster 39 has a threaded portion 39*a* held in mesh with a cap 40 which is fixed at its threaded portion 40*a* to the valve body 30. The end of the threaded portion 39*a* of the adjuster 39 protrudes outwardly of the cap 40 with a lock nut 41 fitted over the protruded portion of the adjuster 39. A hexagonal recess into which a wrench is to be inserted is formed in the end face of the threaded portion 39*a*. By inserting a wrench to the hexagonal recess and rotating the threaded portion 39*a*, the operator axially displaces the adjuster 39 to determine the stop position of the first spool 37 in the direction to open the notches 37*a*. Determining the stop position of the first spool 37, in turn, sets the opening extent of the notches 37*a*.

A spring chamber 42 is formed inside the cap 40 and accommodates therein a spring 43 which has one end held abutted against an inner wall of the cap 40 and the other end held abutted against the end face of the first spool 37. The spring 43 urges the first spool 37 in the direction to close the notches 37*a*.

The first spool 37 is further formed with an internal chamber 37*b* and a drain port 37*c* for communicating between the outlet chamber 33 and the spring chamber 42, as well as a drain port 37*e* for communicating the internal chamber 37*b* with a discharge chamber 37*d*. The discharge chamber 37*d* is in communication with the reservoir. The drain port 37*e* is open to the discharge chamber 37*d* only when the first spool 37 is in its neutral position, for lowering the pressure in both the outlet chamber 33 and the spring chamber 42 down to the reservoir pressure.

On the other hand, rightwardly of the first spool 37 as viewed on the drawing, there is disposed an operating pressure introducing plug 44 which is fixed at its threaded portion 44*c* to the valve body 30. The plug 44 has an internally threaded attachment hole 44*a* into which the piping of the pilot line 19 is attached, and a bore portion 44*b* defining a hydraulic chamber into which the pilot pressure is introduced through the pilot line 19. The pilot pressure introduced to the bore portion or hydraulic chamber 44*b* acts on the right-hand end face of the first spool 37, as viewed on the drawing, for displacing the first spool 37 in the direction to open the notches 37*a* until the first spool 37 comes into abutment against the adjuster 39. Additionally, the inner end of the plug 44 serves as a stopper for determining the stop position of the first spool 37 in the direction to close the notches 37*a*.

The aforesaid first spool 37, discharge chamber 37*d*, adjuster 39, cap 40, lock nut 41, spring chamber 42, spring 43, and operating pressure introducing plug 44 jointly constitute the flow control valve portion 14A shown in FIG. 1.

An inner space of the second spool 38 defines a first hydraulic chamber 50 for introducing the pressure of the hydraulic fluid in the communicating passage 34, and the pressure of the hydraulic fluid introduced to the first hydraulic chamber 50 acts on the bottom wall 38*b* for urging the second spool 38 in the direction to close the through holes 38*c*. Leftwardly of the second spool 38, as viewed on the drawing, there is provided a cap 51 which is fixed at its threaded portion 51*a* to the valve body 30 and accommodates therein a spring guide 51*c*. Also, an inner space of the cap 51 partly defines a second hydraulic chamber 52 between the spring guide 51*c* and the bottom wall 38*b* of the second spool 38. Introduced to the second hydraulic chamber 52 is the pressure of the hydraulic fluid in the outlet chamber 33 through a passage 53 branching from the outlet chamber 33 and another passage 54 branching from the passage 53. The introduced pressure of the hydraulic fluid acts on the bottom wall 38*b* of the second spool 38 for urging the second spool 38 in the direction to open the through holes 38*c*. The second hydraulic chamber 52 also serves as a spring chamber for accommodating therein a spring 55 which has one end supported by a flange 51*b* of the spring guide 51*c*, the flange 51*b* being held abutted against an inner wall of the cap 51, and the other end held abutted against the bottom wall 38*b* of the second spool 38. The spring 55 urges the second spool 38 in the direction to open the through holes 38*c*. The second spool 38 is operated dependent upon balanced condition of an urging force in the closing direction caused by the pressure of the hydraulic fluid in the first hydraulic chamber 50 with an urging force in the opening direction caused by both the pressure of the hydraulic fluid in the second hydraulic chamber 52 and the spring 55, thereby controlling the opening extent of the through holes 38*c* communicating the inlet chamber 31 with the communicating passage 34.

The aforesaid second spool 38, first hydraulic chamber 50, cap 51, spring guide 51*c*, second hydraulic chamber 52, passages 53, 54, and spring 55 jointly constitute the pressure compensating valve portion 14B shown in FIG. 1.

Moreover, the valve body 30 is provided with a load port 60 which is in communication with a passage 53 for taking out the pressure of the hydraulic fluid in the outlet chamber 33, i.e., the load pressure, to the exterior. In this embodiment, the load port 60 is connected via a line 61 to the check valve 12*a* and the transmission line 10 both also shown in FIG. 1.

When the optional hydraulic actuator 13 is not used, the hydraulic pilot valves 16*a*, 16*b* are not operated and, therefore, the pilot pressure is not introduced to the hydraulic chamber 44*b* of the plug 44. In this state, the first spool 37 is displaced by the resilient force of the spring 43 until it abuts against the inner end of the plug 44, whereby the opening extent of the outlet chamber 33 in communication with the communicating passage 34, i.e., the opening extent of the notches 37*a*, is made zero. Accordingly, the hydraulic fluid from the hydraulic pump 1 will not be supplied to the optional directional control valve 12 through the outlet chamber 33, and the inlet chamber 31 is subjected to the pressure effective in driving the other hydraulic actuators 4, 6, 8.

On the other hand, when the optional hydraulic actuator 13 is used, the hydraulic pilot valve 16*a* or 16*b* is operated and the pilot pressure is introduced to the hydraulic chamber 44*b* of the plug 44. In this state, the first spool 37 is displaced toward the adjuster 39 under action of the pilot pressure against the resilient force of the spring 43 and then stopped upon abutting against the adjuster 39, whereby the opening of the outlet chamber 33 in communication with the communicating passage 34, i.e., the notches 37*a*, is opened to such an extent as preset by the adjuster 39. The hydraulic fluid flowing into the inlet chamber 31 from the hydraulic pump 1 is thereby allowed to flow out from the communicating passage 34 to the outlet chamber 33 at a predetermined flow rate dependent upon the opening extent of the notches 37*a* and the differential pressure across the notches 37*a*, followed by supply to the optional directional control valve 12. Now, since the fourth directional control valve 12 is operated, the hydraulic fluid is supplied to the optional hydraulic actuator 13 at a flow rate dependent upon the input amount to the directional control valve 12 and the actuator 13 driven correspondingly.

While the optional hydraulic actuator 13 is being driven, insofar as the pressure in the inlet chamber 31 (i.e. the delivery pressure of the hydraulic pump 1) and the pressure in the outlet chamber 33 (i.e., the load pressure of the optional hydraulic actuator 13) are not fluctuated, the second spool 38 of the pressure compensating valve portion 14B remains at a position where the pressure in the communicating chamber 34 (i.e., the pressure in the first hydraulic chamber 50) is balanced with the sum of the pressure in the outlet chamber 33 (i.e., the pressure in the second hydraulic chamber 52) and the resilient force of the spring 55, so that the pressure difference between the pressure in the communicating chamber 34 and the pressure in the outlet chamber 33, i.e., the differential pressure across the notches 37*a*, is held at a constant value set by the spring 55. If the pressure in the inlet chamber 31 or the pressure in the outlet chamber 33 varies, the aforesaid balanced condition is lost and the second spool 38 of the pressure compensating valve portion 14B is caused to displace to the left or right. During this displacement, since the second spool 38 is displaced such that the pressure in the first hydraulic chamber 50 and the sum of the pressure in the second hydraulic chamber 52 and the resilient force of the spring 55 are balanced with each other, the pressure difference between the pressure in the communicating passage 34 and the pressure in the outlet chamber 33 is always held constant. Through the foregoing operation of the pressure compensating valve portion 14B, the flow rate of the hydraulic fluid passing through the outlet chamber 33 becomes constant dependent upon the opening extent of the notches 37*a* insofar as viscosity of the hydraulic fluid, flow rate coefficient of the hydraulic fluid passing from the communicating chamber 34 to the outlet chamber 33, and other parameters are constant.

Accordingly, the hydraulic fluid is supplied to the optional hydraulic actuator 13 at a flow rate dependent upon the input amount to the directional control valve 12, whereby the actuator 13 is driven in a predetermined direction at a predetermined speed. Further, since the opening extent of the notches 37*a* is set by the adjuster 39 in accord with the capacity of the actuator 13, the hydraulic fluid will not be supplied to the actuator 13 at a flow rate in excess of the set opening even if the directional control valve 12 is maximally operated. As a result, safety in the operation is ensured.

In addition, while the optional hydraulic actuator 13 is being driven, the pressure in the outlet chamber 33 is introduced, as the load pressure of the optional hydraulic actuator 13, to the regulator 9 for the hydraulic pump 1, whereby the displacement volume of the hydraulic pump 1 is controlled so that the delivery pressure of the hydraulic pump 1 is held higher by a fixed value than the load pressure of the actuator 13 (i.e., the pressure in the outlet chamber 33), as mentioned before.

When the hydraulic pilot valve 16*a* or 16*b* is stopped, the directioned control valve 12 is returned to the neutral position, the pilot pressure introduced to the hydraulic chamber 44*b* of the plug 44 disappears, whereupon the first spool 37 is displaced to the right on the drawing, i.e., in the closing direction, by the resilient force of the spring 43 to abut against the inner end of the plug 44, making the opening extent of the notches 37*a* zero. Thus, the notches 37*a* are closed.

With this embodiment, as explained above, when the optional hydraulic actuator 13 is not used, the opening of the outlet chamber 33 in communication with the communicating passage 34, i.e., the opening extent of the notches 37*a* of the first spool 37, can be set to zero with the first spool 37 displaced by the resilient force of the spring 43 disposed adjacent to the adjuster 39. Accordingly, even if the directional control valve 12 is of the open center type, the hydraulic fluid from the hydraulic pump 1 will not flow out to the reservoir through the directional control valve and hence the load sensing control can appropriately be performed when the other actuators 4, 6, 8 are driven.

Further, when the optional hydraulic actuator 13 is used, the pilot pressure from the hydraulic pilot valve 16*a* or 16*b* is introduced to the hydraulic chamber 44*b* of the plug 44 positioned in opposite relation to the adjuster 39, whereby the first spool 37 is displaced toward the adjuster 39 to provide the predetermined set opening extent. As a result, the opening extent once set can precisely be reproduced in an automatic manner. Additionally, the load pressure of the optional hydraulic actuator 13 is taken out through the load port 60 so that the optional hydraulic actuator 13 can also be driven under the load sensing control. With the hydraulic pilot valve 16*a* or 16*b* returned to the neutral position, the opening extent of the notches 37*a* of the first spool 37 is automatically returned to zero with no need of operating the adjuster 39 by the operator.

In other words, the valve apparatus 14 of this embodiment makes it possible to easily adjust the opening extent, precisely set the opening extent when it is to be set again, and improve the operability. Also, the remote operation through the hydraulic pilot valves 16*a*, 16*b* is enabled. In particular, since the pilot pressure from the hydraulic pilot valve 16*a* or 16*b* is used as a pressure for operating the directional control valve 12, the operation of closing the notches 37*a* of the first spool 37 and the operation of opening the notches 37*a* to the predetermined extent can automatically be effected in interlock with the operation of the directional control valve 12.

Further, when any other optional hydraulic actuator is used and the set flow rate is changed to a value in accordance with the capacity of the actuator used, it is only required to loosen the lock nut 41 and rotate the adjuster 39, which enables easy change of the set flow rate. In this connection, since the rotation of the adjuster 39 can be locked by using the lock nut 41, it is possible to always maintain the position of the adjuster 39 once set, and hence surely hold the opening extent of the notches 37*a* constant.

In addition, since the load port 60 is formed in the valve apparatus 14 itself, the load pressure of the optional hydraulic actuator transmitted to the outlet chamber 33 can be introduced to the regulator 9 without using a special piping, and the piping structure for introducing the load pressure can be simplified.

It should be noted that while the foregoing embodiment uses the pilot pressure for operating the directional control valve 12 as the operating pressure introduced to the flow control valve portion 14A of the valve apparatus 14, it is also practicable to provide a specific pilot valve 70 for remotely operating the flow control valve portion 14A and introduce a pilot pressure from the pilot valve 70 to the hydraulic chamber 44*b* of the plug 44 through a line 71. In this case, there can also be obtained the substantially similar advantage as for the foregoing embodiment. That modification is especially useful when directional control valves 3A, 5A, 7A, 12A of manually operated type are used.

INDUSTRIAL APPLICABILITY

According to the present invention, while employing, as the directional control valve for the optional hydraulic actuator, a directional control valve of open center type that is more common and more easily available, the load sensing control can appropriately be effected when the other hydraulic actuators 4, 6, 8 are driven. Since an opening extent of the flow control valve portion can easily be adjusted and the opening extent can precisely be set when set again, it is possible to make the operator free from the inconvenience and thus improve the operability. It is also possible to achieve remote operation by using an operating pressure.

Further, when the load sensing control is to be effected with the load pressure of the optional hydraulic actuator while using a directional control valve of open center type, the piping structure for introducing the load pressure can be simplified.

Additionally, since the pilot pressure for a second directional control valve is used as the operating pressure, the operation of closing the opening of the spool and the operation of enlarging the opening to the set extent can automatically be performed.

We claim:

1. In a hydraulic drive system having a hydraulic pump of variable displacement type, at least one first hydraulic actuator driven by a hydraulic fluid delivered from said hydraulic pump, a first directional control valve of closed center type for controlling a flow of the hydraulic fluid supplied from said hydraulic pump to said first hydraulic actuator, transmission means for introducing a load pressure of said first hydraulic actuator therethrough, a regulator for controlling a displacement volume of said hydraulic pump based on the load pressure introduced through said transmission means to perform load sensing control, a second hydraulic actuator driven by the hydraulic fluid delivered from said hydraulic pump, and a second directional control valve of open center type for controlling a flow of the hydraulic fluid supplied from said hydraulic pump to said second hydraulic actuator, wherein the improvement comprises a pressure compensating valve assembly including:

(a) an inlet chamber connected to said hydraulic pump and an outlet chamber connected to said second directional control valve of open center type;

(b) flow control valve means including a spool having an opening disposed between said inlet chamber and said outlet chamber, an extent of the opening being changed when said spool is displaced, and manually operable adjuster means adapted to abut against said spool for setting the extent of said opening;

(c) pressure compensating valve means for holding a differential pressure across said extent of the opening constant;

(d) spring means disposed in said flow control valve means for urging said spool in a direction to close said opening; and (e) operating pressure introducing means to which an operating pressure is introduced for displacing said spool against said spring in a direction to open said opening until said spool comes into abutment against said adjuster means.

2. A hydraulic drive system according to claim 1, further comprising a load port to which a pressure in said outlet chamber is introduced, said load port being connected to said transmission means so that the pressure in said outlet chamber is transmitted to said transmission means as a load pressure.

3. A hydraulic drive system according to claim 1, wherein said hydraulic drive system comprises a pilot valve for producing a pilot pressure to operate said second directional control valve, said pilot pressure being introduced to said operating pressure introducing means as said operating pressure.

4. A hydraulic drive system according to claim 1, wherein said hydraulic drive system comprises a specific pilot valve for producing a pilot pressure to operate said flow control valve means, said pilot pressure being introduced to said operating pressure introducing means as said operating pressure.

* * * * *